(12) United States Patent
Hazra (10) Patent No.: US 6,539,055 B1
(45) Date of Patent: Mar. 25, 2003

(54) SCENE CHANGE DETECTOR FOR VIDEO DATA

(75) Inventor: Rajeeb Hazra, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/453,715

(22) Filed: Dec. 3, 1999

(51) Int. Cl.$^7$ ................................................ H04N 7/12
(52) U.S. Cl. .................... 375/240.16; 348/700
(58) Field of Search ................ 375/240.16, 240.12, 375/240.26, 240.01, 240.02; 348/699–701, 416.1; 382/236, 238

(56) References Cited

U.S. PATENT DOCUMENTS

| | | | | |
|---|---|---|---|---|
| 5,493,345 A | * | 2/1996 | Ishikawa et al. | 348/700 |
| 5,642,294 A | * | 6/1997 | Taniguchi et al. | 348/700 |
| 5,767,922 A | * | 6/1998 | Zabih et al. | 348/699 |
| 6,014,183 A | * | 1/2000 | Hoang | 348/700 |
| 6,185,363 B1 | * | 2/2001 | Dimitrova et al. | 386/46 |
| 6,211,912 B1 | * | 4/2001 | Shahraray | 348/155 |
| 6,307,980 B1 | * | 10/2001 | Quacchia | 348/700 |
| 6,327,390 B1 | * | 12/2001 | Sun et al. | 345/723 |
| 6,349,113 B1 | * | 2/2002 | Mech et al. | 348/699 |
| 6,360,234 B2 | * | 3/2002 | Jain et al. | 707/500.1 |
| 2001/0003468 A1 | * | 6/2001 | Hampapur et al. | 348/700 |
| 2001/0014203 A1 | * | 8/2001 | Ito et al. | 386/67 |
| 2001/0018693 A1 | * | 8/2001 | Jain et al. | 707/500 |
| 2001/0042114 A1 | * | 11/2001 | Agraharam et al. | 709/223 |
| 2001/0053271 A1 | * | 12/2001 | Okayama et al. | 386/1 |
| 2002/0036717 A1 | * | 3/2002 | Abiko et al. | 348/700 |

OTHER PUBLICATIONS

Wong et al, "Modified Motion Compensated Temporal Frame Interpolation for Very Low bit Rate Video", The Hong Kong University of Science and Technology, Clear Water Bay, Kowloon, Hong Kong, IEEE, pp. 2327–2330.

Wong et al, "Fast Motion Compensated Temporal Interpolation for Video", The Hong Kong University of Science and Technology, Clear Water Bay, Kowloon, Hong Kong, *SPIE*, vol. 2501, pp. 1108–1118.

* cited by examiner

Primary Examiner—Vu Le
(74) Attorney, Agent, or Firm—Kenyon & Kenyon (57) ABSTRACT

A viewer-intuitive index may be built from a stream of video data by detecting scene changes from the stream of video data, capturing reference markers associated with the video data for those portions of the video data for which the scene changes were detected and the storing the reference markers.

33 Claims, 4 Drawing Sheets

SCENE CHANGE DETECTOR FOR VIDEO DATA

BACKGROUND

The present invention relates to a scene change detector for video data.

In most video applications, it is difficult for viewers to navigate through video content in an intuitive manner. A viewer may desire to browse through video content by fast-forwarding or rewinding through it. However, most video data is indexed by a time scale or a frame counter. Because viewers typically do not think in terms of elapsed time or elapsed frames, such indices are not helpful to permit a viewer to quickly identify and select desired subject matter.

Lay users of conventional domestic videocassette recorders may be familiar with this phenomenon when they desire to watch portions of a favorite movie. Often, to reach a desired portion of a movie, it is necessary to fast-forward or rewind the cassette for an arbitrary period of time then play the cassette to determine at what point in the plot the cassette has reached. The "fast-forward, then play" operation is repeated in essentially a hit-or-miss fashion until the viewer has reached the desired portion of the movie. Of course, many conventional video cassette recorders display a running count of elapsed time or elapsed frames while a cassette is fast forwarding. Nevertheless, the "fast-forward, then play" operation is used because viewers do not intuitively correlate elapsed time or frames to video content.

Certain other video applications, for example the later-generation digital video discs and the MPEG-4 video-coding standard, may permit video content publishers to provide semantic information to accompany the video data. Such semantic information, conceivably, could support an index to the information content within the video data. However, in such instances, viewers would be able to use such an index only if the video publisher deigned to create one. Further, particularly in the MPEG-4 example, such semantic information consumes precious bandwidth that the coding standard was designed to conserve.

Accordingly, there is a need in the art for a video application that permits viewers to browse and access video data in an intuitive manner. Further, there is a need for such an application that generates an index to the video information based upon the content of the video information and without consuming the communication bandwidth of the video data signal itself.

SUMMARY

Embodiments of the present invention provide a method of building an index of a stream of video data, in which scene changes are detected from the stream of video data, reference markers associated with the video data are capture for those portions of the video data for which the scene changes were detected and the reference markers are stored.

DETAILED DESCRIPTION

Embodiments of the present invention provide a scene change detector for video data. The scene change detector compares pixel data for several consecutive frames, identifies covered and uncovered pixel data therefrom and, depending upon the number of covered and uncovered pixels, determines that a scene change has occurred.

Figure 1:
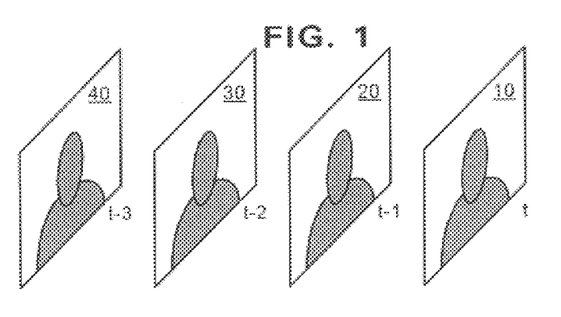
FIG. 1 illustrates an exemplary video data stream.

FIG. 1 illustrates four consecutive frames of video data 10–40 for display. Each frame is populated by a number of picture element ("pixel") locations. Thus, the video data typically is represented by pixel data, at least one pixel coefficient representing the information content of a respective pixel location. The frames of video data 10–40 relate to video information at an arbitrary present time t, and previous times t−1, t−2 and t−3.

Figure 2:
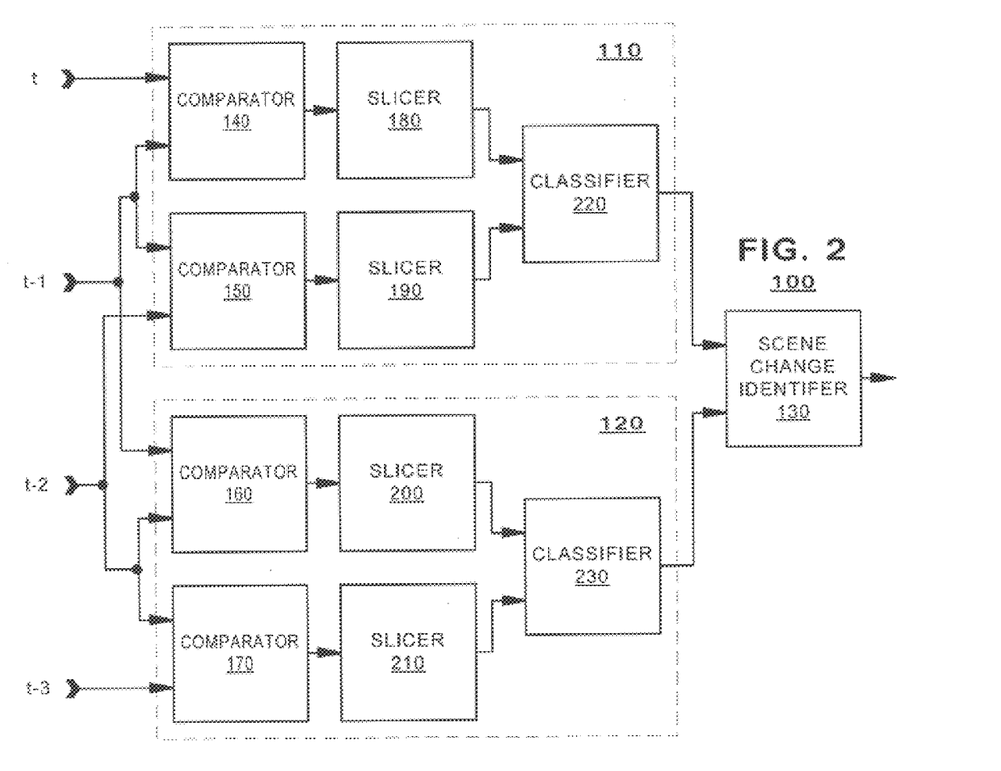
FIG. 2 illustrates a scene change detector according to an embodiment of the present invention.

FIG. 2 illustrates a scene identifier 100 according to an embodiment of the present invention. The scene identifier 100 may be populated by a pair of pixel classifiers 110, 120 and a scene change identifier 130. Each pixel classifier 110, 120 in turn may be populated by a pair of comparators 140–150, 160–170, a pair of slicers 180–190, 200–210 and a pixel classifier 220, 230.

The pixel classifiers 110, 120 each compare video data of three video frames and generate pixel classifications therefrom. The first pixel classifier 110 receives video information from video frames t through t−2 and identifies covered and uncovered pixels therein. The second pixel classifier 120 receives video information from video frames t−1 through t−3 and identifies covered and uncovered pixels therein. The results of the covered/uncovered classification are output from each of the first and second pixel classifiers 110, 120 to the scene change identifier 130. From those results, the scene change identifier 130 determines whether a scene change has occurred in the video data.

The present invention identifies that a scene occurs at a frame t when there is an abrupt change in value at a large number of pixels for the frame t when compared to the pixels of temporally adjacent frames and when the succeeding frames exhibit relative stability. As may be appreciated by a lay observer, a scene change typically involves a complete change of displayed information content at one discrete frame but, after the scene change occurs, the succeeding frames exhibit relative stability. By contrast, other phenomena may cause a large change in displayable content (such as when a camera pans). Although, these phenomena may cause a dynamic change in displayable content from frame-to-frame, they typically do not exhibit marked stability among ensuing frames. Embodiments of the present invention exploit this difference between scene changes and other phenomena.

Accordingly, embodiments of the present invention identify a scene change in a frame t by comparing pixel values among the frame t and a plurality of temporally contiguous frames (for example, frames t−1 through t+2). When there is a high dynamic change in scene content from frame t−1 to frame t and where there is a relatively low change in scene content from frame t through, say, frame t+2, a scene change is detected.

According to the present invention, pixel data from a series of frames may be analyzed to identify "covered" and "uncovered" data in a series of temporally contiguous frames. Each pixel classifier (say, pixel classifier 110) performs a pair of comparisons from three frames (e.g., frame t vs. frame t−1 and frame t−1 vs. frame t−2). The comparison may make on a pixel-by-pixel basis.

Consider the pixel classifier 110 for example. There, a first comparator 140 receives pixel data for a first and second video frame (frames t and t−1). For each pixel in a first video frame (t), the comparator 140 determines a difference between the pixel and a corresponding pixel from the second video frame (t−1). The comparator 140 outputs a signal representing a difference between the pixels of the two frames ($\Delta p_{x,y}$).

The slicer 180 performs threshold detection upon the output from the comparator 140. For those pixels where the $\Delta p_{x,y}$ signal exceeds a predetermined threshold, the slicer 180 outputs a binary signal in an active state (e.g., "ON"). For those pixels where the $\Delta p_{x,y}$ signal does not exceed a predetermined threshold, the slicer 180 may output a binary signal in a second state (e.g., "OFF").

Thus the first comparator 140 and first slicer 180 generate a binary signal for each pixel location in a video display representing the magnitude of the difference between pixel values in frames t and t−1. The binary output of the slicer 180 may be labeled $Q1_{x,y}$.

The second comparator 150 and the second slicer 190 may operate in a similar manner but on different inputs. The second comparator receives pixel data from video frames at times t−1 and t−2 and generates a differential signal therefrom. The second slicer 190 generates a binary signal representing the magnitude of the differential signal. Thus, for each pixel in a video frame, the second comparator 150 and the second slicer 190 outputs a binary signal, labeled $Q2_{x,y}$ representing the change in video data at the pixel location.

The classifier 220 compares the output signals from each slicer 180, 190 in the first pixel classifier 110. Each pixel location will be associated with a Q1-Q2 pair. The Q1-Q2 values determine whether the pixel is covered or uncovered as shown in the following table:

TABLE 1

| Pixel State (Q1) | Pixel State (Q2) | Classification |
|---|---|---|
| OFF | OFF | — |
| OFF | ON | Covered |
| ON | OFF | Uncovered |
| ON | ON | — |

Thus, for each pixel in the video display, the pixel classifier 110 outputs a signal identifying whether the pixel is covered, uncovered or neither covered nor uncovered.

According to an embodiment of the present invention, the second pixel classifier 120 may be constructed similarly to the first pixel classifier 110. The second pixel classifier 120 may receive video data from a series of three video frames, the series delayed by one frame with respect to the video inputs to the first pixel classifier 110. Thus, where the first pixel classifier 110 receives video data from frames t, t−1 and t−2, the second pixel classifier 120 may receives video data from frames t−1, t−2 and t−3.

The second pixel classifier 120 may include first and second comparators 160, 170. The first comparator 160 may receive video data from frames t−1 and t−2 and generates a differential signal therefrom on a pixel-by-pixel basis. The first slicer 200 receives the output from the first comparator 160, compares the output to a predetermined threshold and generates a binary signal Q1 therefrom.

The second comparator 170 may receive video data from frames t−2 and t−3 and generates a differential signal therefrom on a pixel-by-pixel basis. The second slicer 210 receives the output from the second comparator 170, compares the output to a predetermined threshold and generates a binary signal Q2 therefrom. The Q1 and Q2 outputs from the two slicers 200, 210 are input to a classifier 230.

For each pixel in the video display, the second pixel classifier 120 outputs a signal identifying whether the pixel is covered, uncovered or neither covered nor uncovered.

The scene change identifier 130 receives the outputs from the first and second pixel classifiers 110, 120 and generates a signal identifying whether a scene change has occurred.

Figure 3:
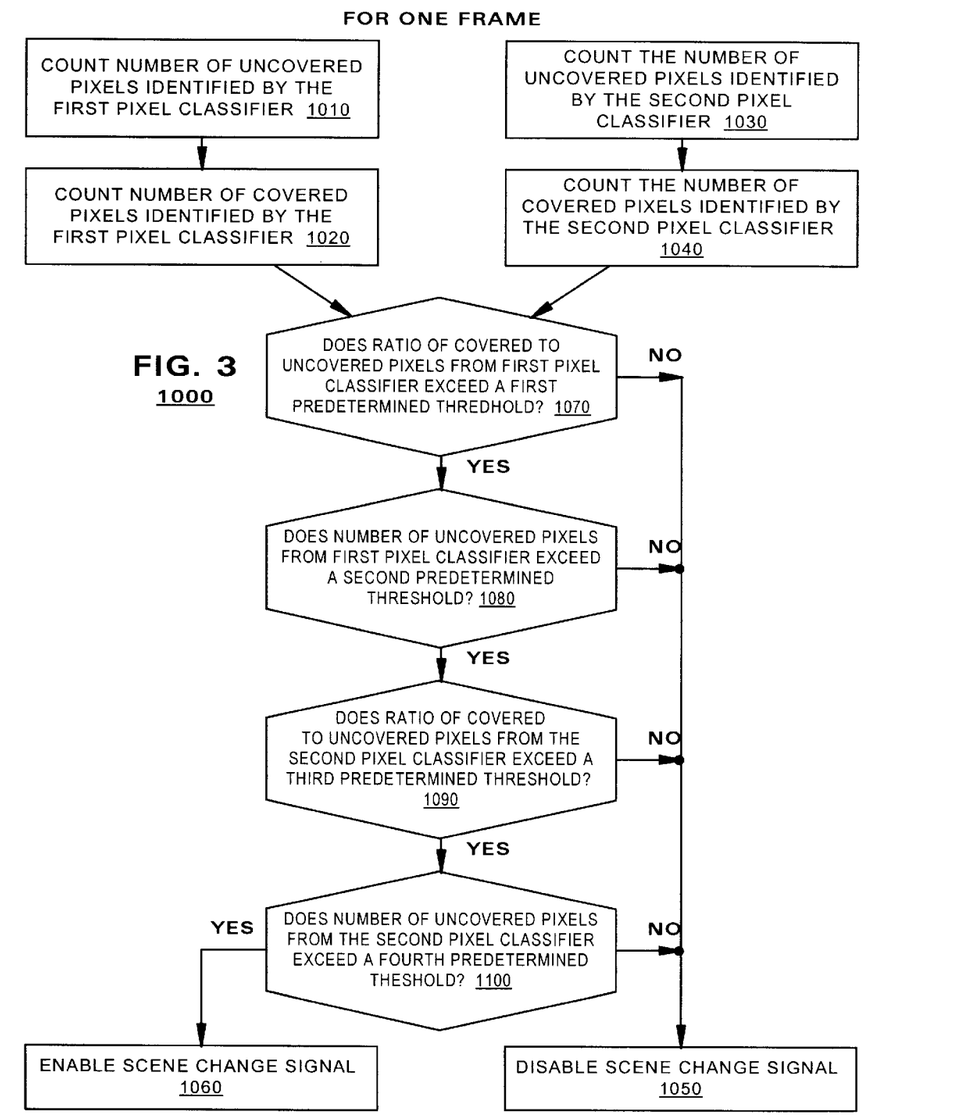
FIG. 3 illustrates a method of operation according to an embodiment of the present invention.

FIG. 3 illustrates a method of operation of the scene change identifier according to an embodiment of the present invention. According to such embodiment, for one frame, the scene change identifier 130 counts the number of uncovered pixels identified by the first pixel classifier 110 (step 1010) and the number of covered pixels identified by the first pixel classifier 120 (step 1020). Similarly, the scene change identifier 130 counts the number of uncovered and covered pixels identified by the second pixel classifier 120 for one frame (steps 1030, 1040).

The scene change identifier 130 may perform a series of threshold tests upon the output from the two pixel classifiers 110, 120 to determine whether a scene change has occurred. If the output data fails any of the threshold tests, it is determined that no scene change occurred (Step 1050). If the output data passes all of the threshold tests, then a scene change has occurred (step 1060).

A first threshold test determines whether the ratio of covered to uncovered pixels identified by the first pixel classifier 110 exceeds a predetermined threshold, labeled TH1 (step 1070). If not, then there can be no scene change.

A second threshold test determines whether the number of uncovered pixels identified by the first pixel classifier 110 exceeds a second predetermined threshold, labeled TH2 (step 1080).

A third threshold test determines whether the number ratio of covered to uncovered pixels from the second pixel classifier exceeds a third predetermined threshold, labeled TH3 (step 1090). According to an embodiment, the first and third predetermined thresholds may be set to the same value (e.g. TH1=TH3, in an embodiment).

A fourth threshold test determines whether the number of uncovered pixels identified by the second pixel classifier 120 exceeds a fourth predetermined threshold, labeled TH4 (step 1100). According to an embodiment, the second and fourth predetermined thresholds may be set to the same value (e.g., TH2=TH4, in an embodiment).

According to an embodiment of the present invention, the thresholds TH1–TH4 each may be programmable thresholds. By allowing user control of such thresholds, it permits a viewer to adjust the sensitivity of the scene change detector 100 to changes in video content.

Figure 4:
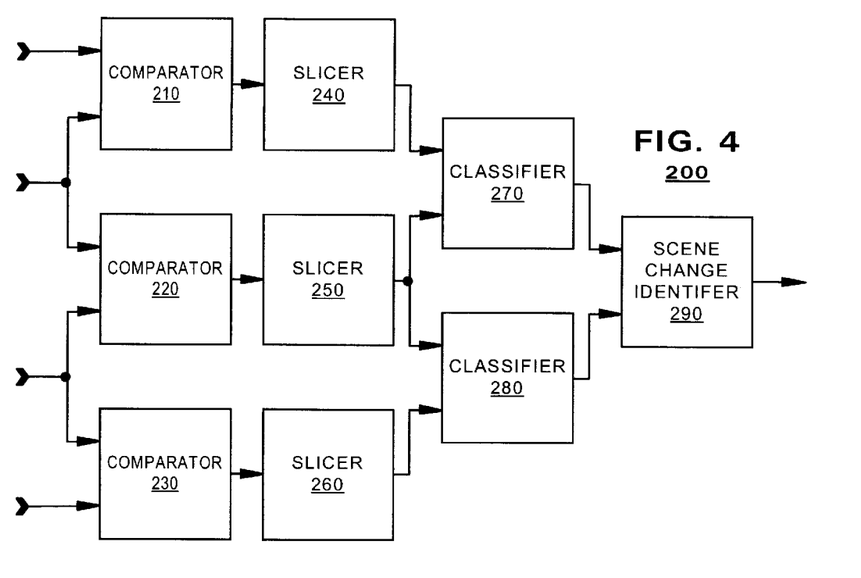
FIG. 4 illustrates a scene change detector according to another embodiment of the present invention.

FIG. 4 illustrates a scene change detector 200 constructed in accordance with another embodiment of the present invention. There, the scene change detector 200 generates a binary scene change signal in response to video content of four frames, such as the frames 10–40 shown in FIG. 1. As compared to the scene change detector 100 of FIG. 2, the scene change detector 200 possesses a more efficient design.

A review of FIG. 2 demonstrates that the first and second pixel classifiers 110, 120 each duplicate a portion of the other's processing. The data path formed by comparator 150 and slicer 190 performs the identical processing as the data path formed by comparator 160 and slicer 200. In the embodiment of FIG. 4, such redundancy is eliminated.

FIG. 4 illustrates a scene change detector 200 that is populated by three comparators 210–230, three slicers 240–260, a pair of classifiers 270–280 and a scene change identifier 290. Each of the comparators 210–230 determines the differences between two consecutive video frames on a pixel-by-pixel basis. Comparator 210 generates a differential signal based upon video frames 10, 20 at times t and t−1. Comparator 220 generates a differential signal based upon video frames at times t−1 and t−2. Comparator 230 generates a differential signal based upon video frames at times t−2 and t−3. The slicers 240–260 each generate a binary ON/OFF signal based on the outputs of the respective comparators 210–230.

The classifier 270 receives the outputs from slicers 240 and 250 as inputs. The output from slicer 240 is received as a Q1 input, the output from slicer 250 is received as a Q2 input. Using these inputs, the classifier 270 generates an output signal according to the scheme identified in Table 1 above.

The second classifier 280 receives the outputs from slicers 250 and 260 as inputs. The output from slicer 250 is received by the second classifiers 280 as a Q1 input, the output from slicer 260 is received as a Q2 input. Using the inputs, the second classifier 280 generates an output signal according to the scheme identified in Table 1 above.

According to an embodiment, the scene change identifier 290 may operate in accordance with the method 1000 of FIG. 3.

Thus, the scene change detector 200 of FIG. 4 provides a more efficient system for detecting scene changes from a video stream than would the scene change detector 100 of FIG. 2 by eliminating certain redundancies. Those of skill in the art will appreciate, however, that the structure of FIG. 2 may be easier to implement in certain circumstances. By way of example, if the scene change detectors 100 and 200 were implemented in software running on a general purpose processor, it may be easier to write a single software routine to perform the functions of a pixel classifier 110 or 120. In such an example, this single software routine may be run twice—once to act as the first pixel classifier 110 and a second time to act as the second pixel classifier 120—each time using different input data. Thus, both embodiments of the scene change identifier 100, 200 have certain advantages that depend upon the application for which they will be used.

Figure 5:
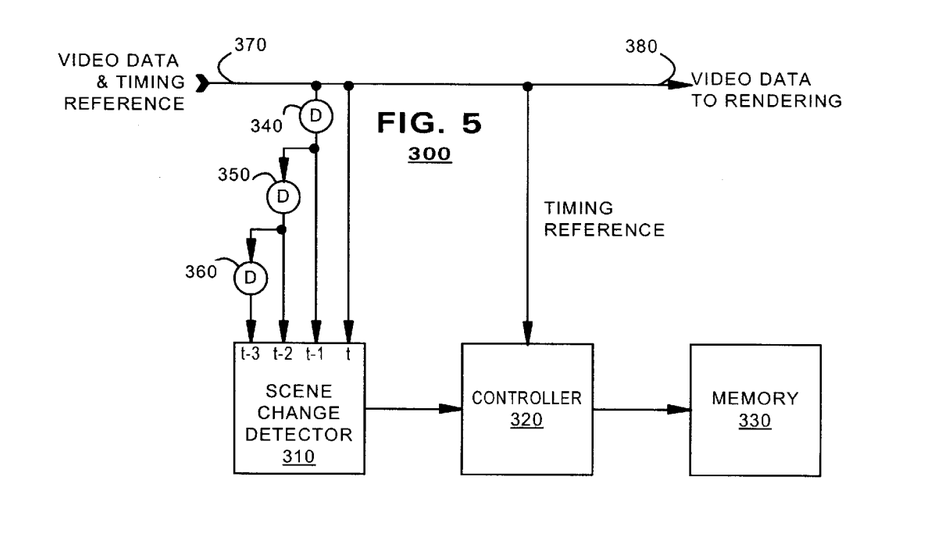
FIG. 5 illustrates a video processing device according to an embodiment of the present invention.

FIG. 5 illustrates a video processing system 300 constructed in accordance with an embodiment of the present invention. The video processing system 300 may use a scene change detector 310 to build an index of a video stream that is based upon scenes. This index could later be used for the video browsing features described above.

The embodiment of FIG. 5 is appropriate for use with data streams that carry their own timing references in the data stream. As is known, in certain video applications such as the MPEG-4 coding standard for motion pictures include timing references embedded as administrative information within same data stream that carries the video data itself. Such timing references may be expressed in terms of an elapsed time for the data stream or as a frame count, by way of example. In such an embodiment, the video processing system 300 builds an index using the embedded timing references.

In the embodiment of FIG. 5, the video processing system 300 may include not only a scene change identifier 310 but also a controller 320, a memory 330 and a plurality of delay stages 340–360. The video processing system 300 also may include an input terminal 370 for input video data and an output terminal 380 for the video data. Note that the input and output terminals 370, 380 are shown as the same node. In this embodiment, the video processing system 300 is shown as a system that operates in parallel with the propagation of video data through a larger video processing system. In this embodiment, the video processing system 300 imposes no delay upon the video data and does not alter the video data in any way.

The scene change detector 310 receives input video data for the four frames at times t, t−1, t−2 and t−3. The delay stages 340–360 each provide a one frame delay to the input video data. The delay stages are interconnected in a cascaded manner so that the data output from delay buffer 360 (and input to the t−3 terminal of scene change detector 310) have passed through all three delay buffers 340–360. The data output from delay buffer 350 is input to the delay buffer 360 and to the t−2 terminal of the scene change detector 310. The data output from delay buffer 340 is input to the delay buffer 350 and also to the t−1 terminal of scene change detector 310. And, finally, the t terminal of the scene change detector 310 is coupled directly to the input terminal 370. The scene change detector 310 generates a binary output in response to these inputs.

The output from the scene change detector 310 is input to the controller 320. In response to a detected scene change from the scene change detector 310, the controller 320 captures the embedded timing information from the data at input terminal 370 that is associated with the video data at time t. The controller 320 stores this information in a memory 330.

The video processing system 300 builds a scene-by-scene index of the video data based on the information content of the video data itself.

Figure 6:
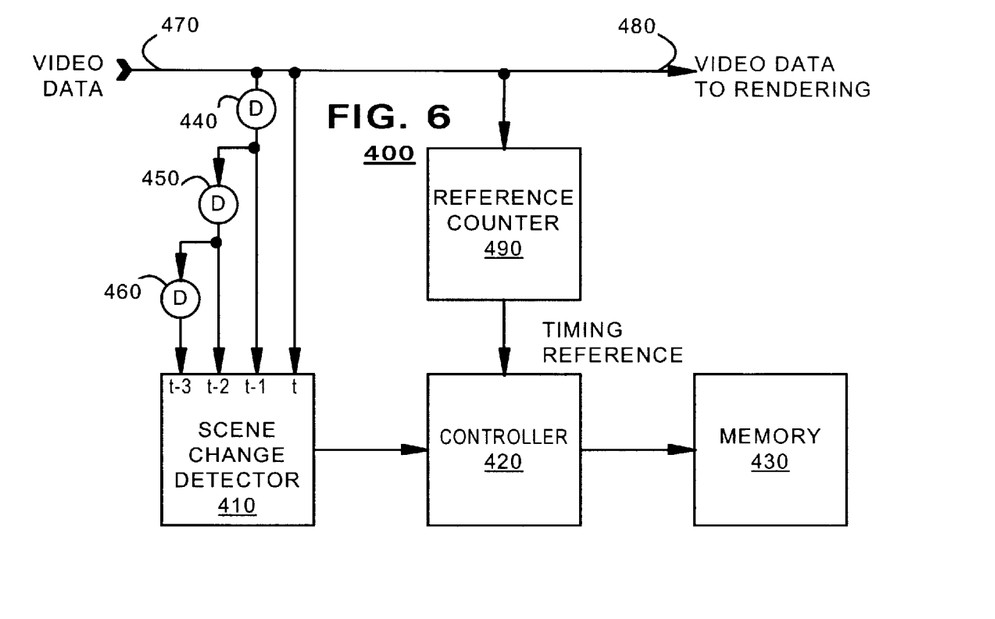
FIG. 6 illustrates a video processing device according to another embodiment of the present invention.

FIG. 6 illustrates another embodiment of a video processing system 400. This second embodiment is appropriate for use in applications where the data stream carrying the video data does not carry timing information embedded therein. For example, conventional video cassettes carry no timing information thereon.

The video processing system 400 may be populated by a scene change detector 410, a controller 420, a memory 430 and a plurality of delay stages 440–460. The scene change detector 400 also includes an input terminal 470 for the input of video data and an output terminal 480. As with the video processor system 500 of FIG. 5, the video processing system 400 of FIG. 6 may be included in a larger video rendering system (not shown) and need not impede or alter the propagation of video data in the larger system.

The video processing system 400 may work with a reference counter 490 that supplies a timing reference for the video data. The reference counter 490 may be provided by the video processing system 400 or may be part of the larger video rendering system. For example, many domestic video cassette recorders include a timing circuit that counts elapsed running time of a cassette while playing. The video processing system 400 need not supply its own reference counter 490 but rather simply may interface with this timing circuit to obtain a timing reference for the video data. In other applications, it may be necessary to supply a reference counter 490 within the video processing system 400. The reference counter 490 may count elapsed time or, alternatively, may count a number of elapsed frames to obtain a timing reference.

The output from the scene change detector 410 is input to the controller 420. In response to a detected scene change from the scene change detector 410, the controller 420 captures a timing reference from the reference counter 490. The controller 420 stores this information in a memory 430.

Thus, the video processing system 400 builds an scene-by-scene index of the video data based on the information content of the video data itself.

One of the advantages of the present invention is that it is able to build the index of scenes in a computationally fast manner. The subtractions, threshold tests and table look-ups that are performed by these embodiments are relatively simple. Thus, the invention may be performed in parallel with other conventional real-time processing that is associated with video processing with little or no performance degradation.

Figure 7:
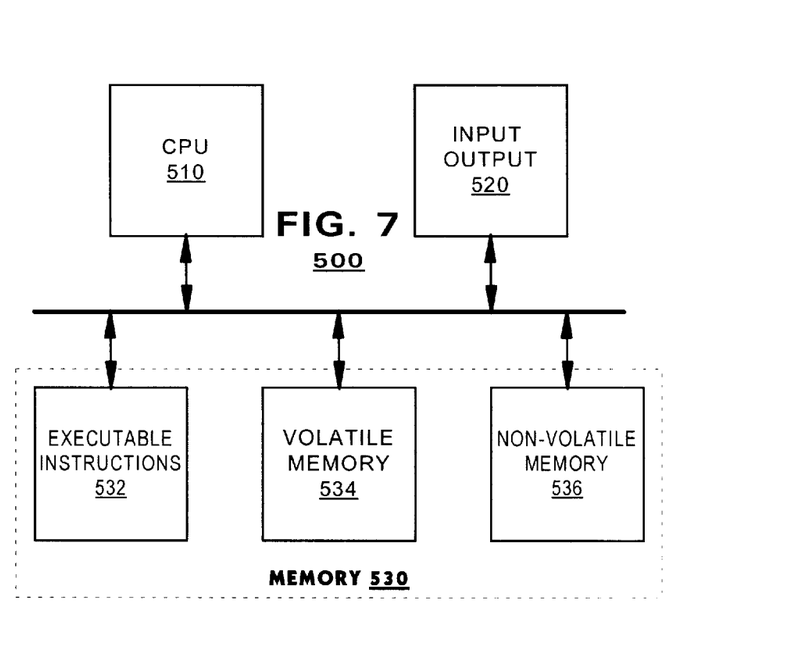
FIG. 7 illustrates a computer system that may be applied with embodiments of the present invention.

FIG. 7 illustrates a computer system 500 that may be adapted to function according to embodiments of the present invention. The computer system 500 may include a central processing unit (CPU) 510 or, alternatively, a digital signal processor or application specific integrated circuit (not shown). The computer system 500 further may include a memory 520. The memory 520 may store executable instructions in a first portion thereof 522 to be executed by the CPU 510. The memory 520 also may include volatile and non-volatile memory portions 524, 526 for storage of the index generated by certain embodiments of the present invention and for use during video processing according to the methods recited herein. According to an embodiment, the memory 520 may be populated by electrical, magnetic or optical memory devices.

According to an embodiment of the present invention, the video data upon which the processes described herein are operative may be stored in the memory 520 or may be received by the computer system 500 via an optional input/output device 530. The input output device may any interface between the computer system and a video source. Accordingly, the input/output device may include a network interface to a larger computer network such as the Internet, an interface to another video communication such as a cable or satellite television system, or to some peripheral device over which video data may be communicated.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A method of building an index of a stream of video data, comprising:

detecting scene changes from the stream of video data, wherein a scene chance for a present frame is detected from:

a first comparison of video content of the present frame and of at least one immediately prior frame, the first comparison indicating a dynamic change in video content, and a second comparison of video content of the present frame and of at least one immediately future frame, the second comparison indicating a low chance in video content; and capturing reference markers associated with the video data for which the scene changes were detected and storing the reference markers.

2. The method of claim 1, wherein the capturing comprises receiving a reference marker from the stream of video data.

3. The method of claim 1, wherein the capturing comprises receiving a reference marker from a reference counter.

4. The method of claim 1, wherein the reference marker is a temporal reference.

5. The method of claim 1, wherein the reference marker is a count of frames of video data.

6. A method of detecting a scene change from display data of a plurality of temporally contiguous frames, comprising:

when there exists a dynamic change in display data among a present frame and an immediately past frame, when there exists a low change in display data among the present frames and at least one future frame, generating an output that identifies the occurrence of a scene change at the present frame.

7. The method of claim 6, further comprising determining that there exists a dynamic change in display data among the past and present frames, by:

counting a number of covered pixels in the present frame counting a number of uncovered pixels in the present frame, and comparing a ratio of the covered pixels to the uncovered pixels to a predetermined threshold.

8. The method of claim 7, further comprising comparing a number of uncovered pixels to a second predetermined threshold.

9. The method of claim 6, further comprising determining that there exists a low change in display data among the present frame and the future frames by:

counting a number of covered pixels in the future frames, counting a number of uncovered pixels in the future frame, and comparing a ratio of the covered pixels to the uncovered pixels in the future frame against a third predetermined threshold.

10. The method of claim 9, further comprising comparing the number of uncovered pixels against a fourth predetermined threshold.

11. A method of building an index of a stream of video data, comprising:

detecting scene changes according to the method of claim 6, and when a scene change is detected, capturing reference markers associated with the video data for which the scene changes were detected and storing the reference markers.

12. The method of claim 11, wherein the capturing comprises receiving a reference marker from the stream of video data.

13. The method of claim 12, wherein the reference marker is a temporal reference.

14. The method of claim 12, wherein the reference marker is a count of frames of video data.

15. A video processing system, comprising:

a scene change detector having an input for a plurality of frames of video data, the detector comprising:

means to compare video content of a present frame and of at least one immediately prior frame and to indicate a dynamic change in said comparison, and means to compare video content of the present frame and of at least one immediately future frame and to indicate a low change in said comparison;

a controller coupled to the scene change detector and having an input for reference marker data associated with the video data; and a memory coupled to the memory controller.

16. The video processing system of claim 15, further comprising a reference counter coupled to the controller.

17. The video processor of claim 15, wherein the controller receives reference marker data from a data stream that also includes the video data.

18. A scene change detector comprising:
a first pixel classifier that identifies covered and uncovered pixels in a first video frame,
a second pixel classifier that identifies covered and uncovered pixels in a second video frame adjacent to the first frame, and
a scene change detector that generates a scene change signal responsive to the identifications made by the first and second pixel classifiers.

19. The scene change detector of claim 18, wherein one of the pixel classifiers comprises:
a pair of comparators, the first comparator receiving pixel data of first pair of adjacent video frames, the second comparator receiving pixel data of a second pair of adjacent video frames, wherein a video frame from the first and second pair are the same,
a pair of slicers, one coupled to each comparator, and
a classifier coupled to each of the slicers.

20. A video processing system, comprising:
the scene change detector of claim 18 having an input for video data,
a controller coupled to the scene change detector and having an input for reference marker data associated with video data, and
a memory coupled to the memory controller.

21. The video processing system of claim 20, further comprising a reference counter coupled to the controller.

22. A scene change detector, comprising:
first through third comparators, each receiving video data of a pair of video frames,
first through third slicers, each coupled to a respective comparator,
a pair of classifiers, one coupled to the first and second slicer, the other coupled to the second and third slicer, and
a scene change identifier coupled to the pair of classifiers.

23. A method of identifying a scene change based on a stream of video data, comprising:
counting a number of covered pixels and a number of uncovered pixels for a first frame of video data,
counting a number of covered pixels and a number of uncovered pixels for a second frame of video data prior and adjacent to the first frame
detecting a scene change that occurred at the first frame if:
a ratio of covered to uncovered pixels for the first frame exceeds a first threshold,
a number of uncovered pixels for the first frame exceeds a second threshold,
a ratio of covered to uncovered pixels for the second frame exceeds a third threshold, and
a number of uncovered pixels for the second frame exceeds a fourth threshold.

24. The method of claim 23, wherein the first and third thresholds are the same.

25. The method of claim 23, wherein the second and fourth thresholds are the same.

26. The method of claim 23, wherein the thresholds are user-programmable.

27. A method of detecting a scene change from a stream of video data, comprising:

comparing pixel data of a first and second video frame and obtaining first a differential signal therefrom,
generating a first binary signal based on a magnitude of the first differential signal,
comprising pixel data of the second and a third video frames and obtaining a second differential signal therefrom,
generating a second binary signal based on a magnitude of the second differential signal, comparing pixel data of the third and a forth video frames and obtaining a third differential signal therefrom,
generating a third binary signal based on a magnitude of the third differential signal, identifying covered and uncovered pixels for the first frame based on the first and second binary signals,
identifying covered and uncovered pixels for the second frame based on the second and third binary signals, and
determining based on the covered and uncovered pixels identified for the first and second frames, whether a scene change occurred at the first frame.

28. The method of claim 27, wherein the determining comprises:
counting a number of covered pixels and a number of uncovered pixels for a first frame of video data,
counting a number of covered pixels and a number of uncovered pixels for a second frame of video data prior and adjacent to the first frame detecting a scene change that occurred at the first frame if:
a ratio of covered to uncovered pixels for the first frame exceeds a first threshold,
a number of uncovered pixels for the first frame exceeds a second threshold,
a ratio of covered to uncovered pixels for the second frame exceeds a third threshold, and
a number of uncovered pixels for the second frame exceeds a fourth threshold.

29. A computer readable medium having stored thereon instructions that, when executed by a processor, cause the processor to:
detect scene changes from a stream of video data, wherein a scene change for a present frame is detected from:
a first comparison of video content of the present frame and of at least one immediately prior frame, the first comparison indicating a dynamic change in video content, and
a second comparison of video content of the present frame and of at least one immediately future frame, the second comparison indicating a low change in video content; and
capture reference markers associated with the video data for which scene changes were detected, and
store the reference markers.

30. A computer readable medium having stored thereon instructions that, when executed by a processor, cause the processor to:
count a number of covered pixels and a number of uncovered pixels for a first frame of video data,
count a number of covered pixels and a number of uncovered pixels for a second frame of video data, the second frame being adjacent to the first frame in a video stream, and
detect a scene change for the first frame if:
a ratio of covered to uncovered pixels for the first frame exceeds a first threshold,
a number of uncovered pixels for the first frame exceeds a second threshold, a ratio of covered to uncovered pixels for the second frame exceeds a third threshold, and a number of uncovered pixels for the second frame exceeds a fourth threshold.

31. A computer readable medium having stored thereon instructions that, when executed by a processor, cause the processor to:

compare pixel data of a first and second video frame and obtaining first a differential signal therefrom, generate a first binary signal based on a magnitude of the first differential signal, compare pixel data of the second and a third video frames and obtaining a second differential signal therefrom, generate a second binary signal based on a magnitude of the second differential signal, comparing pixel data of the third and a fourth video frames and obtaining a third differential signal therefrom, generate a third binary signal based on a magnitude of the third differential signal, identifying covered and uncovered pixels for the first frame based on the first and second binary signals, identify covered and uncovered pixels for the second frame based on the second and third binary signals, and determine, based on the covered and uncovered pixels identified for the first and second frames, whether a scene change occurred at the first frame.

32. The computer readable medium of claim 31, wherein the processor determines that a scene change occurred at the first frame if:

a ratio of covered to uncovered pixels for the first frame exceeds a first threshold, a number of uncovered pixels for the first frame exceeds a second threshold, a ratio of covered to uncovered pixels for the second frame exceeds a third threshold, and a number of uncovered pixels for the second frame exceeds a fourth threshold.

33. A computer readable medium having stored thereon indices of display data, the indices stored on the medium according to the method of, for a frame of display data:

counting a number of covered pixels in the frame, counting a number of uncovered pixels in the frame, counting a number of covered pixels in a second frame temporally adjacent to the first frame, counting a number of uncovered pixels in the second frame, and storing an identifier of the first frame on the computer readable medium when:

a ratio of covered to uncovered pixels for the first frame exceeds a first threshold, a number of uncovered pixels for the first frame exceeds a second threshold, a ratio of covered to uncovered pixels for the second frame exceeds a third threshold, and a number of uncovered pixels for the second frame exceeds a fourth threshold.

* * * * *